United States Patent [19]

Ghilardi

[11] Patent Number: 4,564,055
[45] Date of Patent: Jan. 14, 1986

[54] MOLDING PROFILE OF TIRE CARCASSES

[75] Inventor: Giuliano Ghilardi, Milan, Italy

[73] Assignee: Societa Pneumatici Pirelli S.p.A., Milan, Italy

[21] Appl. No.: 463,241

[22] Filed: Feb. 2, 1983

Related U.S. Application Data

[63] Continuation of Ser. No. 229,505, Jan. 29, 1981, abandoned.

[30] Foreign Application Priority Data

Feb. 29, 1980 [IT] Italy ............................ 20247 A/80

[51] Int. Cl.⁴ ........................... B60C 3/00; B60C 9/22
[52] U.S. Cl. .................................. 152/450; 152/526; 152/537; 152/548
[58] Field of Search ........... 152/352 R, 354 R, 361 R, 152/361 FP, 361 DM, 354 RB, 355, 356 R, 356 A, 357

[56] References Cited

U.S. PATENT DOCUMENTS

| | | | |
|---|---|---|---|
| 1,678,211 | 7/1928 | Davidson | 152/352 R |
| 3,717,190 | 2/1973 | Boileau | 152/361 DM |
| 4,146,415 | 3/1979 | Caretta et al. | 156/124 |
| 4,258,775 | 3/1981 | Samoto | 152/361 DM |
| 4,271,890 | 6/1981 | Pommier | 152/361 DM |
| 4,271,891 | 6/1981 | Pommier | 152/361 DM |

Primary Examiner—Lois E. Boland
Attorney, Agent, or Firm—Stevens, Davis, Miller & Mosher

[57] ABSTRACT

A vulcanized molded tire, comprising a carcass of one or more plies of rubberized cord fabric, sidewalls, a tread band with shoulders at the joining points between said sidewalls and tread, and a breaker comprising a binding structure on each lateral portion inserted between the carcass and the tread band. The carcass plies have a profile in the cross-section comprising in each shoulder a curvilinear tract with the concavity faced towards the outside of the tire, disposed in underlying position with respect to the edges of said breaker and in correspondence with said binding structures.

6 Claims, 4 Drawing Figures

MOLDING PROFILE OF TIRE CARCASSES

This is a continuation of application Ser. No. 229,505 filed Jan. 29, 1981, now abandoned.

This invention relates to tires for motor-vehicle wheels and especially, although not exclusively, to radial tires, i.e., to tires having cords of the carcass plies disposed at an angle of substantially 90° with respect to the equatorial plane of the tire.

The structure of a tire is generally known today. The terms carcass, carcass plies, bead, bead core, crown, breaker, sidewalls, shoulders and tread are used herein to have the same meanings as they have conventionally in the tire art.

It is known that tires often have in the crown zone, between the carcass and tread, a breaker structure which, in radial tires, has an essential structural function and is commonly known as a "belt". The breaker structure, which is substantially inextensible, besides preventing any dilation in the circumferential sense of the carcass following inflation at pressures that are substantially higher than atmospheric pressure, influences to a great extent, the service-life and the handling of the tire during its use.

The experience gained through years of testing several different types of tires and belt structures, has verified that tire behavior, during use, depends to a large extent upon the pre-loading conditions to which the belt is subjected by the inflation pressure, or more precisely, due to the distribution of stresses within the belt structure.

In other words, good tire behavior is directly associated with the uniformity of the pre-loaded state of the belt over the entire belt width.

Equal distribution of the stresses is furthermore, quite difficult to realize. In the first place, difficulties originate from the belt structure. As is known, the belt comprises a plurality of fabric cord layers, textile and/or metallic, that are radially superimposed.

These layers, at the edges of the structure, should be staggered one with the other, in such a way as to render gradual the passage from one zone of considerable flexional rigidity, such as from the zone corresponding to the belt, to a zone that is much more flexible, such as tire sidewall.

In fact, the belt layers will become detached from one another and from the carcass unless one zone gradually merges with the other.

These staggered edges, however, result in a zone of intrinsic frailty in the belt structure at its two edges. Due to this frailty, the marginal zones of the belt can not be preloaded by inflation of the tire to the extent that they should be in order to provide good road behavior.

Many unsuccessful attempts have been made to solve this problem, such as, by using, layers that are folded-over at their extremities, or by reinforcing the extremities by winding strips of cords around them in the longitudinal direction of the tire, or with a small inclination with respect to this latter direction.

Many attempts have also been made to provide an inflated profile of the tire carcass plies, so as to obtain, on the breaker structure, thrusts adapted to impart uniformity to the preloaded state. Technicians have tried to achieve this result by means of interventions on the profile of the tire plies, for example, by shaping the external surface of the tread band, or by means of rubber sheets, particularly of lens-like cross-section, placed in contact with the carcass plies, or inserted between the plies themselves in the most diverse positions.

No matter how much improvement has been obtained, none of the attempts has succeeded in resolving the problem, nor has it provided a means for resolving it. In fact, the results are not yet completely satisfactory, and above all, they do not appear to be susceptible to further substantial improvements by the heretofore attempted measures.

It has now been discovered that further considerable improvements are possible instead, and in particular they can be obtained by influencing, in an appropriate way, the profile of the plies of the inflated tire carcass, i.e., through the adequate intervention on the profile of the carcass plies, before and during molding and vulcanizing of the tire.

An object of the invention is to provide a pneumatic tire for motor vehicles which is devoid of the foregoing disadvantages. Another object of the invention is to provide a pneumatic tire for motor vehicles having a carcass and tread with a breaker structure disposed between the carcass and tread which is adapted to be pre-loaded uniformly. Still another object of the invention is to provide a tire which has a carcass and a breaker structure inserted between the carcass and the tread, molded with a pre-fixed carcass ply profile, in the cross-section of the tire, so that in its passage to an inflated condition for mounting on a vehicle, the profile exercises on the breaker structure thrusts of such an entity and direction, that regular and uniform pre-loading is achieved.

Other objects will become apparent from the following description with reference to the accompanying drawing wherein FIG. 1 illustrates the radially external portion of the carcass plies of one embodiment of the invention;

Figure 1:
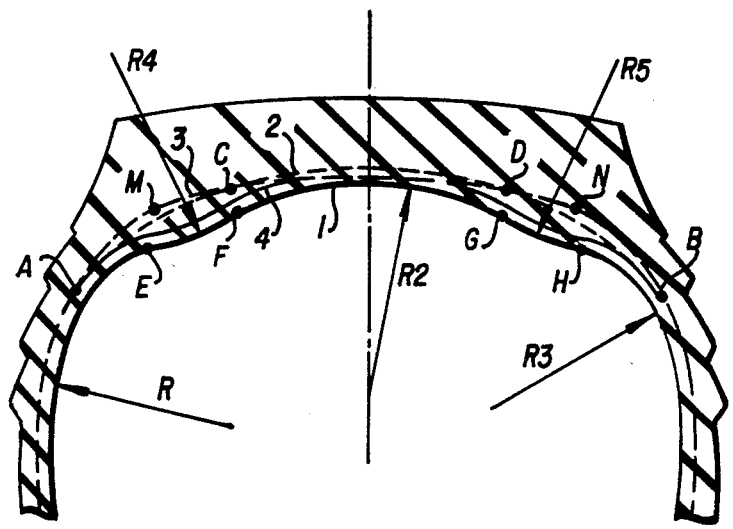

The foregoing objects and others are accomplished in accordance with the invention, generally speaking, by providing a pneumatic tire for motor vehicles having a carcass enclosing a cavity of a substantially toric shape, a tread-band placed in the crown zone outside of the carcass for contacting the ground during tire running, a pair of sidewalls for protecting the carcass axially towards the outside, two zones of connection or shoulders between the tread band and sidewalls and an intermediate breaker structure inserted inbetween the carcass and tread-band, the carcass comprising one or more plies of rubberized cord fabric, the tire being characterized by the fact that after molding and vulcanizing, the profile of the carcass plies, which is substantially concave for forming the cavity in a toric form, presents in the cross-section of the tire, in correspondence of the shoulders, a curvilinear tract having the center of the curvature disposed externally of the cavity, in this way to be substantially convex with respect to the cavity.

The value of the corresponding curvature ray can be increased as much as desired, stretching up to unlimited values, thus causing a progressive flattening of the cavity until the tract at the substantially rectilineal profile is reduced.

The axial dimension of the tract is between 7% and 40% of the distance measured in the axial sense, intervening between the axial outer limit of one tract and the corresponding axial limit of the facing tract.

The lay-out of the profile of the carcass ply as just described, is set out to block the expansion of the carcass plies in the corresponding portions of the tracts and in the yet unvulcanized carcass, through the means of a binding structure that is circumferentially inextensible, such as, for example that comprising, according to a convenient form of realization, a winding of reinforcing cords disposed according to the longitudinal direction of the tire and consituted of material chosen from those adapted for constituting elements that are at least resistant to tractions, such as metal, or certain natural or synthetic fibers.

According to a preferred embodiment of the invention, the binding structure constitutes an integral part of the breaker structure which comprises in addition, at least two radially superimposed layers of metallic cords, parallel to each other in each layer and crossed with that of the adjacent layer, symmetrically inclinded with respect to the longitudinal direction of the tire at an angle of 10° to 30°, the layers being staggered one with the other at their ends, the binding structure being radially overlapping to at last one of the layers in correspondence of its lateral portion.

In particular, the binding structures have their own axially outer border substantially coinciding with that of the widest of its layers of metallic cords.

The preferred embodiment of the invention, is particularly advantageous for a tire of the radial type, with a textile or metallic carcass provided, at its two radially inner ends with beads for anchoring the tire to a mounting-rim, the toric cavity of the tire being towards the outside in its radially inner portion between the beads, the carcass comprising a plurality of plies of rubberized cord fabric reinforced with textile or metallic cords, the beads being provided with circumferentially inextensible annular elements, around which are turned-up the ends of the carcass plies.

Quite conveniently, the tire of the type described, is characterized by an H/C ratio of greater than 0.8.

The following explanation of certain fundamental concepts that lie at the basis of the phenomena which occur in a tire when it is mounted on a rim inflated to a pressure suitable for supporting a vehicle is given to assist in understanding the invention but is not to be construed to limit the scope of the invention. However, these concepts serve for introducing the terminology that will be used to describe the invention.

First and foremost, let us consider the tire constituted by only the carcass ply, eventually anchored at two fixed points such as the bead cores. This inflated carcass assumes a particular form that minimizes the tension and the deformation of the cords of the plies after the inflation, and hence, that which minimizes the global potential energy of deformation absorbed by the tire in its passage from the molded configuration to the inflated configuration.

Let us now refer to as 'equilibrium profile' the profile of the above-said carcass plies in the cross-section of the tire. This profile is approximately that of a flexible wire (i.e. devoid of flexional rigidity) and inextensible, developed between two pre-established fixed points, for example the bead cores of the carcass; the profile is also mathematically definable by opportune terms, which, for that matter are well known to technicians.

In imposing, along the trajectory of the wires other restraining points of the inflated carcass plies, the profile changes and moves away from the equilibrium profile (that we can also call the free-expansion profile), and in practice, we can now speak of an equilibrium profile (in the mathematical sense) only with regard to those wires between two successive points of restraint.

In the actual tire, apart from the two bead cores, there are other points of restraint in the profile of the carcass plies, those constituted by the transverse section of the belt, which is inextensible and non-deformable, and whose profile that does not coincide with that of the equilibrium profile of the carcass plies, in the absence of a breaker, is defined a priori, on the basis of determined criteria of tire planning.

in the actual tire, hence, it is preferred to speak of an inflated profile that coincides with the equilibrium profile only in the sidewall zone, i.e., between the two pairs of points of restraint constituted by beads and by the belt end.

In the carcass portions in which the inflation profile does not coincide with the equilibrium profile (in correspondence of the belt) the inflated carcass exerts thrusts on the restraints (exactly on the belt layers), which are in proportion to the shifting aside between the inflation profile and the equilibrium profile, which direction depends upon the reciprocal position of the two profiles with respect to the cavity which is under pressure.

It is actually these thrusts that pre-load the belt.

On the other hand, in the molded tire, the hypothetical condition for the wires of the carcass plies of being flexible wires, is no longer valid, since the vulcanization of the tire has created a structure endowed with its own rigidity, for which reason, during its passage, from the generic molding profile to the inflation profile, the carcass undergoes deformations, and hence, absorbs an energy of deformation that is proportional to the global shifting away between the two above-said profiles.

One would therefore, seem to conclude that the molded carcass, with a molded profile that provides the above carcass, placed under pressure, to be disposed according to an inflation profile derived from modifications that are calculated and set at the equilibrium profile, is that which minimizes the deformations and the consequent state of tension absorbed by the tire structure mounted on the rim and inflated (the shifting between the two profiles being minimum) and which allows domination of the states of the forces discharged on certain structure, for example, on the belt, by the inflation pressure.

In reality instead, the hypothesis of the totally undeformable and inextensible belt is not rigorously verified, but rather, even this, due to the effects of the inflation pressure of the tire, is subjected to yielding i.e. abnormal shifting of the restraining points, which modify in an unrecognizable way, a priori, the equilibrium profile and hence, the actual inflation profile, and the starting point for calculating the molding profile. In other words, in the actual tire, the molding profile assigned, derived on the basis of theoretical considerations from that of equilibrium, differs even in a sensible and unknown manner, from the ideal one necessary for providing the desired results.

The determination of the ideal molding profile constitutes the technical problem faced by the Applicant, and solved in a way tht will now be described, with reference to the drawing.

In FIG. 1, line 1 illustrates the mold profile of the carcass plies according to the invention, while the broken lines represent respectively, the equilibrium profile 2 of the carcass plies in the absence of the breaker, the inflation profile 3 of the corresponding tire that is usual in the state of the art, derived from that of the equilibrium for the tire provided with an intermediate structure, and the inflation profile 4 corresponding to the mold profile 1.

Around these profiles, in the radially outer position, there is shown the external shape of the tire.

In the figure, the radially inner portion of this tire and the relative carcass profile do not appear since this portion is of no interest for the purpose of the present description.

It is also pointed out that the equilibrium profile 2 and the inflation profile 3, have in common the points A C D B, and the radially inner portions to the points A and B; the profiles are, on the contrary, quite distinct, one from the other, between the points A and B. Points M and N respectively, positioned along the tracts A–C and D–B of the inflated profile 3 can also be seen. Points M and N, represent the axially outer extremities of the belt structure that is inextensible and non-deformable, the profile of which is a planned characteristic, and which is precisely represented by the tracts M C D N of the inflation profile 3.

M and N represent the two already cited points of restraint in the free expansion profile of the carcass plies, which modify precisely, the profile. Equilibrium profile can be spoken of only for the tracts each sidewall, between the beadcore, or any other similar restraint (not illustrated) and the corresponding belt extremity (M or N).

The locations of points A and B of FIG. 1, are hypothetical and not objectively defined. On the other hand, an exact location is not essential for the purpose of the present description, since it can be assumed, besides being mathematically demonstratable, that the qualitative development of the profiles 2 and 3, when compared, must be like that illustrated in the figures.

In fact, the tract A–B of the profile 2, must have the same linear development of the tracts A M C D N B of the profile 3, without presenting any points of discontinuity of the tangent such as M and N.

Turning now to profile 1, this represents the molding profile (of the tire of the invention) and hence, it is not directly confrontable with the profiles 2 and 3 that represent instead, inflation profiles. These latter, have to be compared with profile 4 (only those tracts which shift away from profile 3, are evident) that illustrate the inflation profile of the tire of the invention, i.e. the molding profile 1 as has been modified after the tire has been mounted on the rim, and when it is inflated at operating pressure.

Referring now to profile 1, (it is noted that it is developed according to a substantially concave line), presents along its development, a series of curvatures of rays $R_1$, $R_2$, $R_3$, the centers of which lie within the tire cavity. Nevertheless, according to the invention, there are present two tracts E–F and G–H, situated on opposite sides of the equatorial plane, in correspondence of the tire shoulders, which present curvatures of rays $R_4$ and $R_5$, the centers of which lie externally to the tire cavity.

Consequently, the two profile tracts have a concavity turned towards the tire outside, i.e. in the opposite sense with respect to the remaining part of profile 1. The points E and H coincide substantially with the edges of the breaker structure; while the points F and G will be defined further on in the text.

Figure 2:
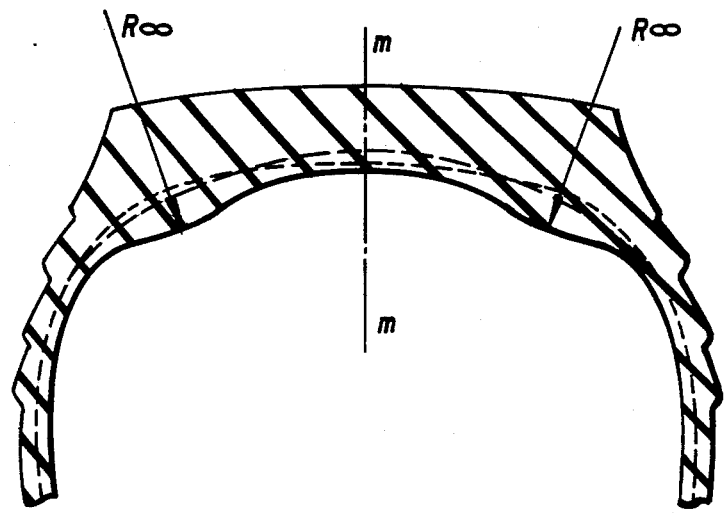
FIG. 2 illustrates a second embodiment of the invention in a fragmentary cross-section of the radially external portion of the tire.

According to another embodiment of the invention, the profile tracts (FIG. 2) can have a variable curvature ray, and be at least in part, rectilineal. However, this, more than being an alternative, is effectively a condition limit of the profile 1 in FIG. 1, and precisely, the condition in which the curvature ray of said tracts $R_4$, $R_5$ is increased greatly, in such a way as to be considered a value of magnitude that is infinite.

Moreover, the orientation of the curvature rays of the tracts, i.e. the inclination with respect to the equatorial plane m—m of the tire, can vary within very wide limits, whereas, that indicated in the figure is only one of the many existing possibilities.

Figure 3:
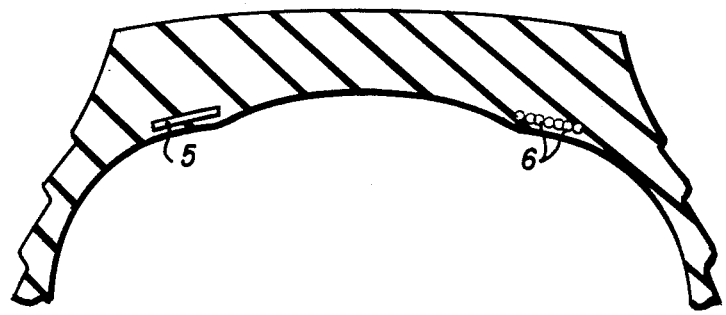
FIG. 3 illustrates in a fragmentary radially outer section, the disposition of an inextensible circumferential structure on the plies of the shaped carcass for obtaining the profile of the carcass plies in accordance with the invention.

FIG. 3 illustrates a practical and convenient manner for realizing the profile according to the invention, i.e. during the phases of tire construction, by means of fitting onto the axially outermost portions of the carcass body, a restraining structure 5, that is circumferentially inextensible. The structure blocks, at a diameter having a pre-fixed value, the corresponding zone of the carcass body, with leaving the zones adjacent instead, to expand further, and in particular the central zone between the two restraining structures. It is clear therefore, that the points E–H and F–G, previously illustrated, substantially represent the axially outer and inner borders of the above-said restraining structure.

Quite conveniently, the axial width of the cavities, and hence, that of the corresponding restraining structures, must be between 7% and 40% of the axial width measured between the axial external limits of the cavities.

One type of realization, that is quite convenient for this structure, illustrated in detail in the portion of the right side of the cross-section in FIG. 3, is the one constituted by a winding of cords 6, easy for being applied directly over the carcass, as well as for being prepared apart and fitted-on the carcass successively, realized in such a way as to be circumferentially inextensible.

Provided that this condition is respected and guaranteed, various structures are possible, and various materials may be used.

For example, a single cord can be helically wound many coils, or a strip of rubberized fabric provided with a plurality of cords disposed parallel to each other and oriented in the longitudinal sense to the strip, coincident to the longitudinal direction of the tire may be helically wound in one or several turns radially overlying each other.

The material of the cords must be a material adapted for producing elements that are resistent at least to tractions, preferably one which can be used in the least quantity of material possible. Quite conveniently, metals, in particular, steel and certain synthetic fibers such as the one advertised by DU PONT under the Trade Mark "Kelvar", an aromatic polyamide, and equally suitable materials can be used, such as textile fibers, natural or synthetic; or inorganic materials such as glass, asbestos etc.

In fact any cord suitable for use in pneumatic tires may be used.

To end with, the restraining structure can be made to advantage, as an integral part of the breaker structure that is to be inserted between the carcass and the tread band.

Figure 4:
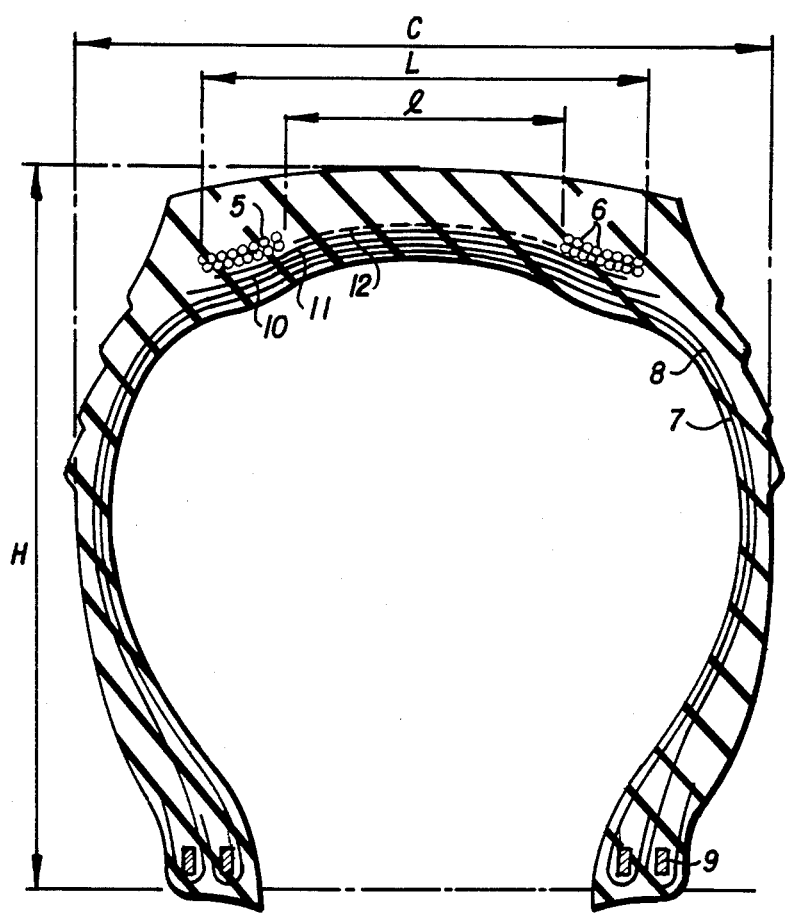
FIG. 4 is a cross-section of one embodiment of the pneumatic tire provided by the invention.

An example of this embodiment, is illustrated in FIG. 4, where there is shown the cross-section, in a radial plane, of a giant tire of the radial type, in the double bead-core series.

Considering only the elements that are essential for this structure, two groups of plies 7 and 8, can be noted for the carcass (rubberized cord fabric, reinforced with rayon cords), each group having its extremities turned-up around the bead-core 9.

This tire is provided with a belt having two layers 10 and 11 of metallic cords which are parallel to each other in each layer, and crossed with those of the adjacent layer, symmetrically inclined with respect to the equatorial plane, at an angle between 10° and 30°, the two layers being staggered one to the other at their extremities, the widest layer being in a radially inner position.

On the two extremities of this pack of layers, there are placed the two restraining structures 5 for the carcass plies, each one constituted by a double winding of metallic cords 6, disposed longitudinally, with the axially outer border coinciding with that of the widest layer; the axial development of each winding being, according to the general condition already fixed, equal to 18% of the total axial development of the belt structure. In other words, the ratio l/L, variable between 0.20 and 0.86 in the described tire, is equal to 0.64.

FIG. 4, illustrates the tire just as it is extracted from the mold after vulcanizing. It can be clearly noted that the profile of the carcass ply has the lay-out that was previously illustrated.

It is moreover, worth clarifying at once, that the belt structure just described, can vary according to the type of tire involved. In other words, it can present various numbers of cord layers, in particular a further layer 12, disposed in a radially outer position between the restraining structures, the cords being textile and/or metallic, disposed according to any desired angles, the two lateral restraining structures being positioned either radially internal or external, or interposed between the belt layers axially not bordering, or otherwise, contained within the above-layers.

Hence, one skilled in the art will not have any difficulty in understanding the teachings and suggestions of the state of the art, for constructing, in accordance with the invention, the most suitable belt structure for the purpose desired. In particular, the types of tires just described are countersigned by the ratio H/C i.e., by the ratio between the cross-section height and the maximum width of the said cross-section (FIG. 4) of greater than 0.8.

The tires of the invention have demonstrated qualitative advantages with respect to the known tires, as has been stated at the beginning of the present description.

One possible justification becomes easily comprehensible when considering FIG. 1. It will be noted that the radially outermost portion of the inflation profile 4 is inside of the equilibrium profile 2, contrary to the known inflation profile 3. For which reason, on the basis of what has been explained previously, it is clear that the carcass plies, in passing to the condition of being an inflated tire, exert on the breaker structure a thrust directed radially towards the outside. This thrust is concentrated on the tire shoulders with respect to the thrust obtainable in tires molded according to the profile derived from the equilibrium profile.

This thrust, directed towards the outside, pre-loads and tensions the whole belt structure from one extremity to another. In this way, by opportunely selecting the entity of the concavity (towards the outside) of the carcass profile under the belt extremity, in correspondence of the cord structure at 0° a more uniform distribution of the forces exerted by the carcass on the belt is obtained.

In other words the known tire structures, which have carcasses molded with an equilibrium profile and belts having layers of crossed cords, the tensioning stresses exerted by the carcass plies on the belt end are reduced, whereas in the tire of the invention even said end zone, which is known to constitute the weakest point of resistance of the breaker, can be preloaded and without the usual deformations of the crossed belt layers because the crossed layers are prevented from moving relatively to each other, by the winding of the cords at 0° which support, to a great extent, the tension, which otherwise, would be completely absorbed by the crossed layers.

Hence, on the basis of this hypothesis, the reason for the unsatisfactory behavior of the tires of the state of the art can be understood and also the reason why they can not be improved is apparent.

It should be remembered, that in these tires, the molding profile is obtained from the inflation profile (derived from the equilibrium profile) with maximum adherence between the two profiles, so that this molding profile is always concave towards the inside of the tire, in particular, even in correspondence of the shoulders in the zone of joining with the profile of the breaker structure. In practice, the molding profile is substantially coincident with the inflation profile 3.

It can be seen from FIG. 1, that in the known tires, inflated tire condition gives origin to a thrust in the direction outside of the central portion of the breaker (tract C–D inside the equilibrium profile), but to a thrust that is almost nil or even to a thrust directed towards the inside on the breaker extremity (tracts A–C and D–B outside the equilibrium profile) with a consequent reduction of the pre-loaded state in the zone, when a state of compression is not even reached, in the cords of the breaker layers that result quite damaging for both, tire behavior during exercise, as well as the service-life of the tire.

In fact, the inflated profile 3, owing to the inevitable yielding of the belt structure adjacent to its extremity, is caused to coincide substantially with the equilibrium profile 2, rounding-off the corners of the points M and N.

Now recalling what has already been stated i.e., that the molding profile, for the tire of the state of the art, coincides substantially with the theoretical inflated profile 3 (illustrated), it is logically concluded that, in the passage from uninflated to inflated tire, the belt extremities undergo thrusts directed towards the inside of the tire.

It can also be noted that, thanks really to the lay-out of the two profiles 2 and 3, the negative effects in the known tires are reduced, with reduction of the H/C ratio of the tire, for which reason, the tires of the lowered series, under this aspect, have a behavior that is better than that of the so-called "standing tires" with the H/C greater than 0.8. In that tires, the problem still remains of reducing the deformation of the ends of the crossed layers and this problem is not solved by simply overlapping, in correspondence of said end zones, strips of cords wound at 0°, without a modification of the moulding profile of the carcass plies.

The above also seems to provide an explanation of the fact that the invention explains the best results in the tires characterized by a ratio H/C that is greater than 0.8.

Although the invention has been described in detail for the purpose of illustration, it is to be understood that such detail is solely for that purpose and that variations can be made by those skilled in the art without departing from the spirit and scope of the invention except as it may be limited by the claims.

What is claimed is:

1. A pneumatic tire for motor vehicles comprising a toric-shaped radial carcass of one or more plies of rubberized cord fabric, a tread band on a crown portion of said carcass, a breaker structure inserted between said tread band and said carcass, a pair of sidewalls connected through shoulders to said tread band and terminating radially inwardly with bead portions, said breaker structure comprising at least two radially superimposed layers of metallic crossed cords, parallel to each other in each layer and crossed with those of an adjacent layer and symmetrically inclined with respect to the circumferential direction of the tire at an angle between 10° and 30°, said layers being staggered one with the other at their extremities, and comprising also a restraining structure extending circumferentially at each edge of said breaker structure, the axial outer border of said restraining structure being substantially coincident with that of the widest metallic crossed cord layer, wherein said carcass ply or plies have, after molding and vulcanizing, a cross-section profile with a curvilinear tract, adjacent to each shoulder, whose concavity is directed towards the outside of the tire, the axial outer extremity of said tract being substantially coincident with the axial outermost portion of said restraining structure.

2. A pneumatic tire of claim 1, wherein the axial inner extremity of said curvilinear tract is substantially coincident with the axial innermost border of said restraining structure.

3. A pneumatic tire of claim 2, wherein the axial width of said restraining structure is between 7% and 40% of the width of said breaker structure.

4. A pneumatic tire of claim 1 wherein said restraining structure comprises circumferentially disposed tension-resistant cords, selected from the group consisting of metal wires, and synthetic or natural textile fibers, so as to block expansion of the carcass ply or plies, under shaping inflation pressure, in those portions adjacent to said restraining structures.

5. A pneumatic tire of claim 4 wherein said restraining structure comprises a fabric strip, reinforced with metallic cords disposed in a strip parallel to each other and circumferentially oriented, said strip being wound in two superimposed turns, radially overlapping both said layers of metallic crossed cords.

6. A pneumatic tire of claim 1 whose cross-section is of height H and maximum width C, wherein the value of the H/C ratio is greater than 0.8.

* * * * *